US011521639B1

(12) United States Patent
Shon et al.

(10) Patent No.: US 11,521,639 B1
(45) Date of Patent: Dec. 6, 2022

(54) SPEECH SENTIMENT ANALYSIS USING A SPEECH SENTIMENT CLASSIFIER PRETRAINED WITH PSEUDO SENTIMENT LABELS

(71) Applicant: ASAPP, Inc., New York, NY (US)

(72) Inventors: Suwon Shon, Jersey City, NJ (US); Pablo Brusco, Buenos Aires (AR); Jing Pan, San Jose, CA (US); Kyu Jeong Han, Pleasanton, CA (US)

(73) Assignee: ASAPP, INC., New York, NY (US)

( * ) Notice: Subject to any disclaimer, the term of this patent is extended or adjusted under 35 U.S.C. 154(b) by 0 days.

(21) Appl. No.: 17/334,575

(22) Filed: May 28, 2021

Related U.S. Application Data

(60) Provisional application No. 63/170,173, filed on Apr. 2, 2021.

(51) Int. Cl.
*G10L 25/30* (2013.01)
*G06N 3/08* (2006.01)
(Continued)

(52) U.S. Cl.
CPC .............. *G10L 25/30* (2013.01); *G06N 3/088* (2013.01); *G10L 19/02* (2013.01); *G10L 21/10* (2013.01)

(58) Field of Classification Search
CPC ......... G10L 25/30; G10L 19/02; G10L 21/10; G06N 3/088
See application file for complete search history.

(56) References Cited

U.S. PATENT DOCUMENTS

| 5,649,060 A | 7/1997 | Ellozy et al. |
| 7,502,741 B2 | 3/2009 | Finke et al. |
| (Continued) | | |

FOREIGN PATENT DOCUMENTS

| CN | 106569998 A | 4/2017 |
| WO | 2019076866 | 4/2019 |

OTHER PUBLICATIONS

Mohammad, S. "A Practical Guide to Sentiment Annotation: Challenges and Solutions," In Proceedings of the 7th Workshop on Computational Approaches to Subjectivity, Sentiment and Social Media Analysis, 2016, pp. 174-179.
(Continued)

*Primary Examiner* — Michael N Opsasnick
(74) *Attorney, Agent, or Firm* — Lessani Law Group, PC

(57) ABSTRACT

The present disclosure describes a system, method, and computer program for predicting sentiment labels for audio speech utterances using an audio speech sentiment classifier pretrained with pseudo sentiment labels. A speech sentiment classifier for audio speech ("a speech sentiment classifier") is pretrained in an unsupervised manner by leveraging a pseudo labeler previously trained to predict sentiments for text. Specifically, a text-trained pseudo labeler is used to autogenerate pseudo sentiment labels for the audio speech utterances using transcriptions of the utterances, and the speech sentiment classifier is trained to predict the pseudo sentiment labels given corresponding embeddings of the audio speech utterances. The speech sentiment classifier is then subsequently fine tuned using a sentiment-annotated dataset of audio speech utterances, which may be significantly smaller than the unannotated dataset used in the unsupervised pretraining phase.

20 Claims, 3 Drawing Sheets

(51) Int. Cl.
*G10L 19/02* (2013.01)
*G10L 21/10* (2013.01)

(56) References Cited

U.S. PATENT DOCUMENTS

| | | | |
|---|---|---|---|
| 7,633,551 | B2 | 12/2009 | Sullivan |
| 8,086,458 | B2 | 12/2011 | Finke et al. |
| 8,131,545 | B1 | 3/2012 | Moreno et al. |
| 8,230,343 | B2 | 7/2012 | Logan et al. |
| 8,289,366 | B2 | 10/2012 | Greenwood et al. |
| 10,528,866 | B1 | 1/2020 | Dai et al. |
| 10,554,817 | B1 | 2/2020 | Sullivan et al. |
| 10,572,534 | B2 | 2/2020 | Readler |
| 11,055,055 | B1 | 7/2021 | Fieldman |
| 11,106,442 | B1 | 8/2021 | Hsiao et al. |
| 11,138,970 | B1 | 10/2021 | Han et al. |
| 11,238,278 | B1 | 2/2022 | Swanson et al. |
| 2002/0116361 | A1 | 8/2002 | Sullivan |
| 2005/0117879 | A1 | 6/2005 | Sullivan |
| 2005/0151880 | A1 | 7/2005 | Sullivan |
| 2005/0222036 | A1* | 10/2005 | During ............ C07K 14/57563 514/6.9 |
| 2007/0011012 | A1 | 1/2007 | Yurick et al. |
| 2007/0206881 | A1 | 9/2007 | Ashikaga |
| 2008/0092168 | A1 | 4/2008 | Logan et al. |
| 2012/0278071 | A1 | 11/2012 | Garland et al. |
| 2013/0071837 | A1* | 3/2013 | Winters-Hilt ........ C12Q 1/6869 977/932 |
| 2013/0124984 | A1 | 5/2013 | Kuspa |
| 2013/0191185 | A1 | 7/2013 | Galvin |
| 2015/0106091 | A1 | 4/2015 | Wetjen et al. |
| 2016/0078339 | A1 | 3/2016 | Li et al. |
| 2016/0088153 | A1 | 3/2016 | Wicaksono et al. |
| 2016/0117339 | A1 | 4/2016 | Raskin et al. |
| 2016/0358321 | A1 | 12/2016 | Xu et al. |
| 2017/0062010 | A1 | 3/2017 | Pappu et al. |
| 2018/0013699 | A1 | 1/2018 | Sapoznik et al. |
| 2018/0130484 | A1 | 5/2018 | Dimino, Jr. et al. |
| 2018/0165554 | A1* | 6/2018 | Zhang .................. G06K 9/6256 |
| 2018/0204111 | A1* | 7/2018 | Zadeh .................. G06N 3/0436 |
| 2018/0301143 | A1 | 10/2018 | Shastry et al. |
| 2019/0065515 | A1 | 2/2019 | Raskin et al. |
| 2019/0103095 | A1 | 4/2019 | Singaraju et al. |
| 2019/0188590 | A1 | 6/2019 | Wu et al. |
| 2019/0205748 | A1* | 7/2019 | Fukuda ..................... G06N 3/08 |
| 2019/0251165 | A1 | 8/2019 | Bachrach et al. |
| 2020/0097820 | A1 | 3/2020 | Song et al. |
| 2020/0184207 | A1 | 6/2020 | Breslav |
| 2020/0184278 | A1* | 6/2020 | Zadeh .................. G06K 9/6264 |
| 2020/0218780 | A1 | 7/2020 | Mei et al. |
| 2020/0265273 | A1* | 8/2020 | Wei ......................... G06N 3/084 |
| 2020/0344194 | A1* | 10/2020 | Hosseinisianaki ..... G06Q 10/10 |
| 2021/0074260 | A1* | 3/2021 | Gopala ................ G06N 3/0454 |
| 2021/0081613 | A1* | 3/2021 | Begun .................. G06F 40/106 |
| 2021/0233535 | A1 | 7/2021 | Shir |
| 2021/0256417 | A1* | 8/2021 | Kneller ................. G06N 3/088 |
| 2021/0295822 | A1* | 9/2021 | Tomkins ............... G06F 16/328 |
| 2021/0304769 | A1* | 9/2021 | Ye .......................... G10L 15/065 |
| 2022/0198229 | A1 | 6/2022 | Onate Lopez et al. |

OTHER PUBLICATIONS

Lu, Z., et al. "Speech Sentiment Analysis via Pre-trained Features from End-to-End ASR Models," In ICASSP 2020-2020 IEEE International Conference on Acoustics, Speech and Signal Processing (ICASSP), IEEE, 2020, pp. 7149-7153.

Li, R., et al. "Dilated Residual Network with Multi-Head Self-Attention for Speech Emotion Recognition," In ICASSP 2019-2019 IEEE International Conference on Acoustics, Speech and Signal Processing (ICASSP), IEEE, 2019, pp. 6675-6679.

Li, P., et al. "An Attention Pooling based Representation Learning Method for Speech Emotion Recognition," Proc. Interspeech 2018, pp. 3087-3091.

Wu, X., et al. "Speech Emotion Recognition Using Capsule Networks," In ICASSP, IEEE International Conference on Acoustics, Speech and Signal Processing (ICASSP). IEEE, 2019, pp. 6695-6699.

Xie, Y., et al. "Speech Emotion Classification Using Attention-Based LSTM," IEEE/ACM Transactions on Audio, Speech, and Language Processing, vol. 27, No. 11, pp. 1675-1685, 2019.

Mirsamadi, S., et al. "Automatic Speech Emotion Recognition Using Recurrent Neural Networks with Local Attention," In 2017 IEEE International Conference on Acoustics, Speech and Signal Processing (ICASSP), pp. 2227-2231.

Devlin, J., et al. "BERT: Pre-training of Deep Bidirectional Transformers for Language Understanding," 2018.

Zadeh, A., et al. "Multimodal Language Analysis in the Wild: CMU-MOSEI Dataset and Interpretable Dynamic Fusion Graph," In Proceedings of the 56th Annual Meeting of the Association for Computational Linguistics (vol. 1: Long Papers), 2018, pp. 2236-2246.

Kim, E., et al. "DNN-Based Emotion Recognition Based on Bottleneck Acoustic Features and Lexical Features," In ICASSP 2019-2019 IEEE International Conference on Acoustics, Speech and Signal Processing (ICASSP), IEEE, 2019, pp. 6720-6724.

Siriwardhana, S., et al. "Jointly Fine-Tuning "BERT-like" Self Supervised Models to Improve Multimodal Speech Emotion Recognition," Proc. Interspeech 2020, pp. 3755-3759.

Cho, J., et al. "Deep Neural Networks for Emotion Recognition Combining Audio and Transcripts," Proc. Interspeech 2018, pp. 247-251.

Kuo, et al. "End-to-End Spoken Language Understanding Without Full Transcripts," 2020.

Haghani, P., et al. "From Audio to Semantics: Approaches to End-to-End Spoken Language Understanding," In 2018 IEEE Spoken Language Technology Workshop (SLT), IEEE, 2018, pp. 720-726.

Lugosch, L., et al. "Speech Model Pre-training for End-to-End Spoken Language Understanding," 2019, pp. 814-818.

Wolf, T., et al. "Transformers: State-of-the-Art Natural Language Processing," 2019.

Sanh, V., et al. "DistilBERT, a Distilled Version of BERT: Smaller, Faster, Cheaper and Lighter," 2019.

Liu, Y., et al. "RoBERTa: A Robustly Optimized BERT Pretraining Approach," 2019.

Yang, Z., et al. "XLNET: Generalized Autoregressive Pretraining for Language Understanding," 33rd Conference on Neural Information Processing Systems, 2019.

Cieri, C., et al. "The Fisher Corpus: a Resource for the Next Generations of Speech-to-Text" In LREC, vol. 4, 2004, pp. 69-71.

Han, K. J., et al. "Multistream CNN for Robust Acoustic Modeling," 2020.

Kim, S., et al. "Joint CTC-Attention Based End-to-End Speech Recognition Using Multi-Task Learning," In 2017 IEEE International Conference on Acoustics, Speech and Signal Processing (ICASSP), IEEE, 2017, pp. 4835-4839.

\* cited by examiner

SPEECH SENTIMENT ANALYSIS USING A SPEECH SENTIMENT CLASSIFIER PRETRAINED WITH PSEUDO SENTIMENT LABELS

RELATED APPLICATIONS

This application claims the benefit of U.S. Provisional Application No. 63/170,173 filed on Apr. 2, 2021, and titled "Leveraging Pre-Trained Language Model for Speech Sentiment Analysis," the contents of which are incorporated by reference herein as if fully disclosed herein.

BACKGROUND OF THE INVENTION

1. Field of the Invention

This invention relates generally to using machine learning to perform speech sentiment analysis and, more specifically, to predicting sentiment labels for audio speech utterances using a speech sentiment classifier pretrained with pseudo sentiment labels.

2. Description of the Background Art

Speech sentiment analysis is the task of classifying speech with sentiments, such as neutral, positive, or negative. Sentiments may represent many different types of emotions. For example, negative sentiment not only contains the anger emotion, but also includes disparagement, sarcasm, doubt, suspicion, frustration, etc.

The conventional approach for speech sentiment analysis for a new domain is using automatic speech recognition (ASR) on speech and them employing machine learning sentiment analysis on the ASR transcripts so that it becomes a text classification task in a 2-step pipeline or cascade pipeline. FIG. 1A illustrates the conventional approach in which audio speech is inputted into an ASR system (110), which outputs a text transcription of the speech that is then fed into a text sentiment classifier (120). However, this approach has two major drawbacks. First, it loses the rich acoustic/prosaic information in audio speech that is critical to understand spoken language. Second, there is a lack of large sentiment-annotated databases available when it comes to the conversation domain. Therefore, the text sentiment classifiers used in the approach are typically trained on non-conversational sentiment-annotated text (e.g., text produced originally in a written communication channel).

To address the first drawback, end-to-end (E2E) sentiment analysis systems have been recently proposed. As shown in FIG. 1B, audio speech is inputted into an E2E ASR encoder, which creates a vector representation of the speech input. The vector representation is inputted into the sentiment classifier, which outputs a sentiment class (e.g., positive, negative, neutral). However, this solution does not address the second drawback. In fact, for this solution to work effectively, it requires a large sentiment-annotated audio speech dataset to train the sentiment classifier. As such datasets are annotated manually by human, this is very time consuming and expensive.

Therefore, there is need for a sentiment classifier system that addresses both problems discussed above. Specifically, there is long-standing demand for a speech sentiment classifier that takes into account acoustic/prosodic information in speech and that can efficiently be trained with minimum human supervision and annotation.

SUMMARY OF THE DISCLOSURE

The present disclosure describes a system, method, and computer program for predicting sentiment labels for audio speech utterances using an audio speech sentiment classifier pretrained with pseudo sentiment labels. The speech sentiment classifier is first pretrained in an unsupervised manner by leveraging a text-trained pseudo labeler to autogenerate pseudo sentiment labels for an unannotated audio speech dataset. Pseudo labels are machine-generated labels that are used as proxies for human-generated labels in training a neural network. The speech sentiment classifier is then fine tuned using an audio speech dataset annotated with human-generated sentiment labels.

In the pretraining phase, the system obtains unannotated audio speech utterances from a first dataset. The audio speech utterances in the first dataset are not labeled with sentiments. The system obtains text transcriptions of the utterances, and then applies a text-trained pseudo labeler to the text transcripts to generate pseudo sentiment labels for the audio speech utterances in the first dataset. The pseudo sentiment labels generated in the pretraining phase are machine-generated predictions of the sentiments of the audio speech utterances based on text transcripts of the audio speech utterances, as opposed to human-annotated sentiment labels for the audio speech utterances. In certain embodiments, the pseudo labeler is a pre-trained text language model, such as a bi-directional encoder representation with transformers (BERT) model, with a sentiment classification layer fine tuned with sentiment-annotated text.

The system uses the pseudo sentiment labels to pretrain the speech sentiment classifier to predict sentiments for audio speech. Specifically, the system applies an audio encoder to the unlabeled audio speech utterances in the first dataset to obtain vector representations of the audio speech utterances. The system then trains the speech sentiment classifier to predict the pseudo sentiment labels for the audio speech utterances in the first dataset given the corresponding vector representations of the utterances.

In the fine-tuning phase, the speech sentiment classifier is fine-tuned using a second dataset of audio speech utterances that are annotated with sentiment labels (i.e., a human-annotated dataset). The system applies the audio encoder to the audio speech utterances in a second dataset to obtain vector representation of the audio speech utterances. The system then trains a sentiment classifier to predict the sentiment labels for the audio speech utterances in the second dataset given the corresponding vector representations.

After the pretraining and fine-tuning phases, the system uses the speech sentiment classifier to classify unlabeled audio speech utterances with sentiments.

The disclosed solution overcomes the two drawbacks of prior art systems discussed above. The input to the system in the prediction phase is audio speech, and, therefore, rich acoustic/prosodic information is factored into the sentiment analysis. The fact that there are not large sentiment-annotated databases on which to train a sentiment classifier is addressed by pretraining the audio speech sentiment classifier using an unannotated speech database and a pseudo labeler to machine-generate sentiment labels for the speech. This pretraining phase is performed in an unsupervised manner in that it does not require humans to label the speech utterances in the pretraining dataset.

DETAILED DESCRIPTION OF THE PREFERRED EMBODIMENTS

Figure 2:
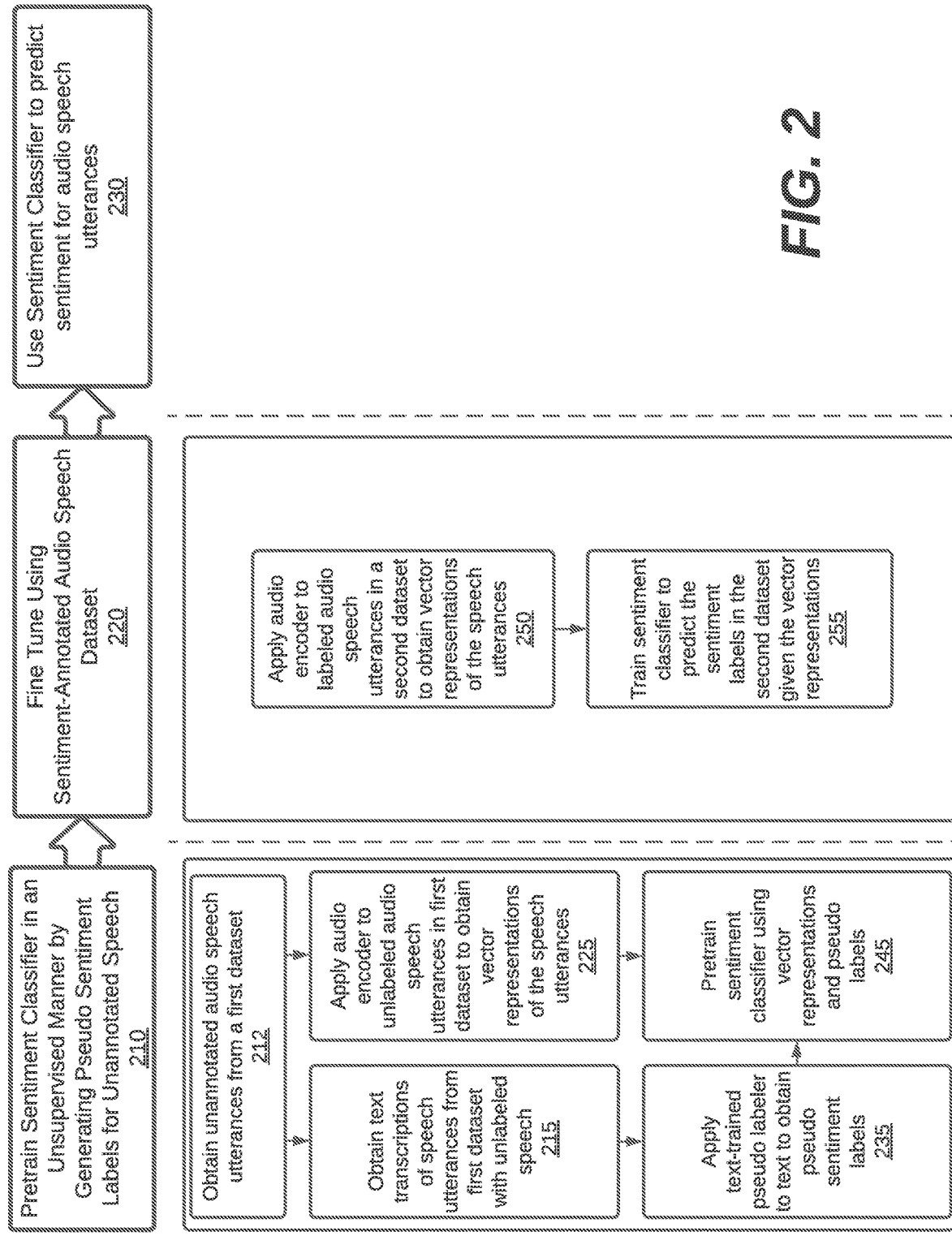
FIG. 2 is a flowchart that illustrates a method, according to one embodiment, for predicting sentiment labels for audio speech utterances using a speech sentiment classifier pretrained with sentiment labels.
Figure 3:
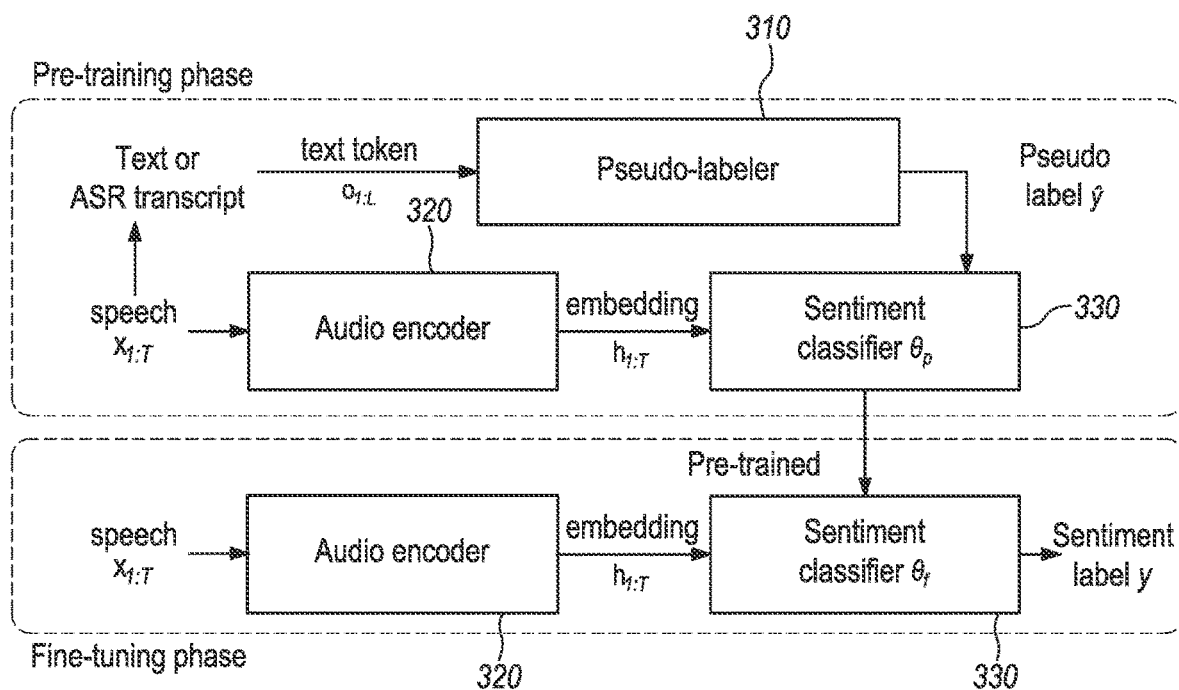
FIG. 3 is a block diagram that illustrates a method for training a speech sentiment classifier to predict sentiment labels for audio speech utterances.

The present disclosure describes a system, method, and computer program for predicting sentiment labels for audio speech utterances using an audio speech sentiment classifier pretrained with pseudo sentiment labels. As described in more detail below with respect to FIGS. 2 and 3, the method includes an unsupervised pretraining phase, a supervised fine-tuning phase, and a prediction phase. The term "speech" herein refers to audio (i.e., spoken) speech.

1. Unsupervised Pretraining of a Speech Sentiment Classifier Using a Pseudo Labeler for Text
1.1 Autogenerating Pseudo Sentiment Labels The system pretrains a sentiment classifier for audio speech ("a speech sentiment classifier") in an unsupervised manner by leveraging a pseudo labeler previously trained to predict sentiments for text. Specifically, the system uses a text-trained pseudo labeler to autogenerate (i.e., machine-generate) pseudo sentiment labels for unannotated audio speech utterances and then uses the pseudo sentiment labels to pretrain the speech classifier (step 210). The pretraining steps are described in more detail below.

The system obtains unannotated audio speech utterances from a first dataset (step 212). The audio speech utterances in the first dataset are not labeled with sentiments. To generate pseudo sentiment labels for the audio speech utterances, the system obtains text transcriptions of the utterances (step 215), and then applies a text-trained pseudo labeler (310) to the text transcripts to obtain pseudo sentiment labels for the audio speech utterances in the first dataset (step 235). The sentiment labels obtained in step 235 are pseudo sentiment labels because they are machine-generated predictions of the sentiment of the text transcriptions of the audio speech as opposed to human-annotated sentiment labels for the audio speech. As stated above, pseudo labels are machine-generated labels that are proxies for human-generated labels in training a neural network.

In certain embodiments, the audio speech utterances are inputted into an automatic speech recognition system (ASR) to obtain the text transcriptions. In certain embodiments, the pseudo labeler is a sentiment classifier previously trained to classify written texts with a sentiment. For example, the pseudo labeler may be a pre-trained language model with a sentiment classification layer fine-tuned with sentiment-annotated text. In certain embodiments, the pre-trained language model is a bi-directional encoder representation with transformers (BERT) model. (See J. Devlin, M.-W. Chang, K. Lee, and K. Toutanova, "Bert: Pretraining of deep bidirectional transformers for language understanding," arXiv preprint arXiv, 1810.04085, 2018, the contents of which are incorporated by reference herein). As discussed in Section 3 of the Devlin reference:

3 BERT

We introduce BERT and its detailed implementation in this section. There are two steps in our framework: pre-training and fine-tuning. During pre-training, the model is trained on unlabeled data over different pre-training tasks. For fine-tuning, the BERT model is first initialized with the pre-trained parameters, and all of the parameters are fine-tuned using labeled data from the downstream tasks. Each downstream task has separate fine-tuned models, even though they are initialized with the same pre-trained parameters. The question-answering example in FIG. 1 will serve as a running example for this section.

A distinctive feature of BERT is its unified architecture across different tasks. There is minimal difference between the pre-trained architecture and the final downstream architecture.

Model Architecture BERT's model architecture is a multi-layer bidirectional Transformer encoder based on the original implementation described in Vaswani et al. (2017) and released in the tensor2tensor library. Because the use of Transformers has become common and our implementation is almost identical to the original, we will omit an exhaustive background description of the model architecture and refer readers to Vaswani et al. (2017) as well as excellent guides such as "The Annotated Transformer."

In this work, we denote the number of layers (i.e., Transformer blocks) as L, the hidden size as H, and the number of self-attention heads as A. We primarily report results on two model sizes: $BERT_{BASE}$ (L=12, H=768, A=12, Total Parameters=110 M) and $BERT_{LARGE}$ (L=24, H=1024, A=16, Total Parameters=340 M).

$BERT_{BASE}$ was chosen to have the same model size as OpenAI GPT for comparison purposes. Critically, however, the BERT Transformer uses bidirectional self-attention, while the GPT Transformer uses constrained self-attention where every token can only attend to context to its left.

Input/Output Representations To make BERT handle a variety of down-stream tasks, our input representation is able to unambiguously represent both a single sentence and a pair of sentences (e.g., <Question, Answer>) in one token sequence. Throughout this work, a "sentence" can be an arbitrary span of contiguous text, rather than an actual linguistic sentence. A "sequence" refers to the input token sequence to BERT, which may be a single sentence or two sentences packed together.

Figure 1A:
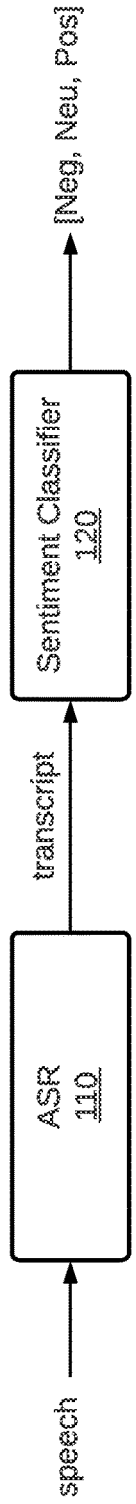
FIGS. 1A-1B are block diagrams illustrate prior art approaches to speech sentiment classification.
Figure 1B:
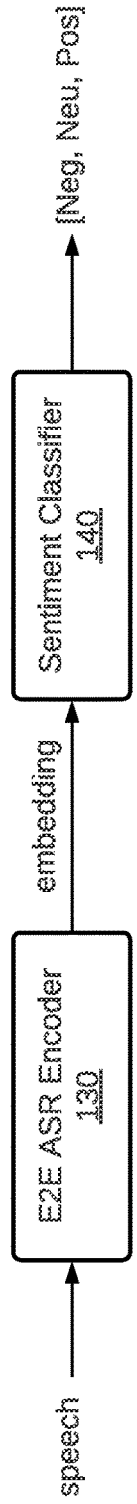

We use WordPiece embeddings (Wu et al., 2016) with a 30,000 token vocabulary. The first token of every sequence is always a special classification token ([CLS]). The final hidden state corresponding to this token is used as the aggregate sequence representation for classification tasks. Sentence pairs are packed together into a single sequence. We differentiate the sentences in two ways. First, we separate them with a special token ([SEP]). Second, we add a learned embedding to every token indicating whether it belongs to sentence A or sentence B. As shown in FIG. 1, we denote input embedding as E, the final hidden vector of the special [CLS] token as $C \in R^H$, and the final hidden vector for the $i^{th}$ input token as $T_i \in R^H$.

For a given token, its input representation is constructed by summing the corresponding token, segment, and position embeddings. A visualization of this construction can be seen in FIG. 2.

3.1 Pre-Training BERT

Unlike Peters et al. (2018a) and Radford et al. (2018), we do not use traditional left-to-right or right-to-left language models to pre-train BERT. Instead, we pre-train BERT using two unsupervised tasks, described in this section. This step is presented in the left part of FIG. 1.

Task #1: Masked LM Intuitively, it is reasonable to believe that a deep bidirectional model is strictly more powerful than either a left-to-right model or the shallow concatenation of a left-to-right and a right-to-left model. Unfortunately, standard conditional language models can only be trained left-to-right or right-to-left, since bidirectional conditioning would allow each word to indirectly "see itself", and the model could trivially predict the target word in a multi-layered context.

In order to train a deep bidirectional representation, we simply mask some percentage of the input tokens at random, and then predict those masked tokens. We refer to this procedure as a "masked LM" (MLM), although it is often referred to as a Cloze task in the literature (Taylor, 1953). In this case, the final hidden vectors corresponding to the mask tokens are fed into an output softmax over the vocabulary, as in a standard LM. In all of our experiments, we mask 15% of all WordPiece tokens in each sequence at random. In contrast to denoising auto-encoders (Vincent et al., 2008), we only predict the masked words rather than reconstructing the entire input.

Although this allows us to obtain a bidirectional pre-trained model, a downside is that we are creating a mismatch between pre-training and fine-tuning, since the [MASK] token does not appear during fine-tuning. To mitigate this, we do not always replace "masked" words with the actual [MASK] token. The training data generator chooses 15% of the token positions at random for prediction. If the i-th token is chosen, we replace the i-th token with (1) the [MASK] token 80% of the time (2) a random token 10% of the time (3) the unchanged i-th token 10% of the time. Then, $T_i$ will be used to predict the original token with cross entropy loss. We compare variations of this procedure in Appendix C.2.

Task #2: Next Sentence Prediction (NSP) Many important downstream tasks such as Question Answering (QA) and Natural Language Inference (NLI) are based on understanding the relationship between two sentences, which is not directly captured by language modeling. In order to train a model that understands sentence relationships, we pre-train for a binarized next sentence prediction task that can be trivially generated from any monolingual corpus. Specifically, when choosing the sentences A and B for each pretraining example, 50% of the time B is the actual next sentence that follows A (labeled as IsNext), and 50% of the time it is a random sentence from the corpus (labeled as NotNext). As we show in FIG. 1, C is used for next sentence prediction (NSP). Despite its simplicity, we demonstrate in Section 5.1 that pre-training towards this task is very beneficial to both QA and NLI.

The NSP task is closely related to representation-learning objectives used in Jernite et al. (2017) and Logeswaran and Lee (2018). However, in prior work, only sentence embeddings are transferred to down-stream tasks, where BERT transfers all parameters to initialize end-task model parameters.

Pre-training data The pre-training procedure largely follows the existing literature on language model pre-training. For the pre-training corpus we use the BooksCorpus (800 M words) (Zhu et al., 2015) and English Wikipedia (2,500 M words). For Wikipedia we extract only the text passages and ignore lists, tables, and headers. It is critical to use a document-level corpus rather than a shuffled sentence-level corpus such as the Billion Word Benchmark (Chelba et al., 2013) in order to extract long contiguous sequences.

3.2 Fine-Tuning BERT

Fine-tuning is straightforward since the self-attention mechanism in the Transformer allows BERT to model many downstream tasks—whether they involve single text or text pairs—by swapping out the appropriate inputs and outputs. For applications involving text pairs, a common pattern is to independently encode text pairs before applying bidirectional cross attention, such as Parikh et al. (2016); Seo et al. (2017). BERT instead uses the self-attention mechanism to unify these two stages, as encoding a concatenated text pair with self-attention effectively includes bidirectional cross attention between two sentences.

For each task, we simply plug in the task-specific inputs and outputs into BERT and fine-tune all the parameters end-to-end. At the input, sentence A and sentence B from pre-training are analogous to (1) sentence pairs in paraphrasing, (2) hypothesis-premise pairs in entailment, (3) question-passage pairs in question answering, and (4) a degenerate text-∅ pair in text classification or sequence tagging. At the output, the token representations are fed into an output layer for token-level tasks, such as sequence tagging or question answering, and the [CLS] representation is fed into an output layer for classification, such as entailment or sentiment analysis.

Compared to pre-training, fine-tuning is relatively inexpensive. All of the results in the paper can be replicated in at most 1 hour on a single Cloud TPU, or a few hours on a GPU, starting from the exact same pre-trained model. We describe the task-specific details in the corresponding subsections of Section 4. More details can be found in Appendix A.5.

1.2 Using the Pseudo Labels to Pretrain the Speech Sentiment Classifier

The system uses the pseudo sentiment labels to pretrain the speech sentiment classifier to predict sentiments for audio speech. Specifically, the system applies an audio encoder (320) to the unlabeled audio speech utterances in the first dataset to obtain vector representations of the audio speech utterances (step 225). As the audio encoder is applied directly to the audio speech utterances, the vector representations capture rich acoustic/prosodic in the audio speech. In certain embodiments, the audio encoder is an encoder part of an ASR system having an encoder and decoder, and in other embodiments, the encoder is the encoder part of a Wav2Vec model. (See S. Schneider, A. Baevski, R. Collobert, M. Auli, "wav2vec: Unsupervised Pre-Training for Speech Recognition," arXiv:1904.05862v4 [cs.CL], 11 Sep. 2019, the contents of which are incorporated by reference herein. See also A. Baevski, H. Zhou, A. Mohamed, M. Auli, "wav2vec 2.0: A Framework for Self-Supervised Learning of Speech Representations," arXiv:2006.11477v3 [cs.CL], 22 Oct. 2020, the contents of which are incorporated by reference herein.)

The system then applies the speech sentiment classifier (330) to the vector representations of the audio speech utterances and trains the speech sentiment classifier to predict the corresponding pseudo sentiment labels (step 245). In other words, for each vector representation, the speech sentiment classifier is trained to predict the pseudo sentiment label corresponding to the same audio speech utterances as the vector representation. In the pretraining phase, the machine-generated pseudo sentiment labels are used as the ground truth against which the speech sentiment classifier is trained. The pretraining of the speech sentiment classifier is done by maximizing $P(\hat{y}|\theta_p, h_{1:T})$, where $\hat{y}$ is the pseudo sentiment label generated by the pseudo labeler in response to text token sequence $o_{1:L}$ (i.e., the text transcript of audio speech utterance $x_{1:T}$);

$\theta_p$ are the parameters of the speech sentiment classifier in the pretraining phase; and $h_{1:T}$ is the audio encoder output (i.e., the vector representation of an audio speech utterance) in response to input acoustic feature sequence $x_{1:T}$ (i.e., an audio speech utterance).

During the pretraining, the parameters, $\theta_p$, of the speech sentiment classifier are iteratively adjusted to optimize the classifier's ability to predict the pseudo sentiment labels. In certain embodiments, the parameters of the audio encoder also are iteratively adjusted to optimize the speech sentiment classifier predictions of the pseudo sentiment labels by improving the vector representations of the audio speech utterances.

2. Fine-Tuning the Sentiment Classifier Using Actual Labels and Audio Speech

The speech sentiment classifier (330) is fine-tuned using a second dataset of audio speech utterances that are annotated with sentiment labels (step 220). The system applies the audio encoder to the speech utterances in a second dataset to obtain vector representation of the audio speech utterances (step 225). The system then trains the speech sentiment classifier to predict the sentiment labels in the second dataset given the vector representations (step 255). In other words, for each annotated audio speech utterances in the second dataset, the system trains the speech sentiment classifier to predict the sentiment label for the audio speech utterance given the corresponding vector representation of the audio speech utterance. The fine tuning of the speech sentiment classifier is done by maximizing $P(y|\theta_f, h_{1:T}; \theta_p)$, where y is the actual sentiment label from the second dataset;

$\theta_f$ are the parameters of the speech sentiment classifier in the fine tuning phase;

$\theta_p$ are the parameters of the speech sentiment classifier in the pretraining phase; and $h_{1:T}$ is the audio encoder output (i.e., the vector representation of an audio speech utterance) in response to input acoustic feature sequence $x_{1:T}$ (i.e., an audio speech utterance).

During the fine tuning phase, the parameters, $\theta_f$, of the speech sentiment classifier are iteratively adjusted to optimize the classifier's ability to predict the sentiment labels for the audio speech utterances in the second dataset. In certain embodiments, the parameters of the audio encoder are also iteratively adjusted to optimize the speech sentiment classifier predictions of the sentiment labels by improving the vector representations of the audio speech utterances.

The second dataset is a human-annotated dataset (i.e., a dataset in which the audio speech utterances were annotated with a sentiment by a human). The pretraining phase enables the size of the second (human-annotated) dataset to be smaller than the human-annotated dataset used to train the speech sentiment classifier illustrated in FIG. 1B for the same accuracy or better. The second (human-annotated) dataset may be may be significantly smaller than the first (unannotated) dataset. For example, the first (unannotated) dataset may be approximately 20 times larger than the second (human-annotated) dataset. In one embodiment, the first (unannotated) dataset included approximately 1900 hours of speech data, whereas the second (human-annotated) dataset included approximately 86 hours of speech data. Pretraining with a large unannotated dataset and fine tuning with a significantly smaller annotated dataset (e.g., at least 5-500 times smaller) save a substantial amount of time and cost in training the speech sentiment classifier. The effectiveness of this approach is shown in the experiment results set forth in the provisional patent application listed in the "Related Applications" section herein.

The pseudo sentiment labels in the pretraining phase may be the same or different than the sentiment labels used in the fine tuning phase.

2. Prediction Phase

After the pretraining and fine-tuning phases, the system uses the speech sentiment classifier to predict sentiments for unlabeled audio speech utterances. The trained system is an end-to-end solution in that the system is applied directly to audio speech utterances (and not text transcripts of audio speech utterance) to obtain sentiment predictions for the audio speech utterances. Specifically, unlabeled audio speech utterances are inputted into the audio encoder, which generates vector representations of the audio speech utterances that capture acoustic/prosodic information in the audio speech utterances. The trained speech sentiment classifier is then applied to the vector representations to obtain sentiment predictions for the unlabeled audio speech utterances.

In certain embodiments, the speech sentiment classifier may be used to improve an entity's customer service, such as using the speech sentiment classifier to:

Evaluate customer trends and performance.

Identify insights for customer service variables that tend to be associated with positive or negative sentiment.

Segment and filter agent-customer transcripts based on initial sentiment, final sentiment, or sentiment change.

Drill into specific utterances with particular positive or negative sentiment for quicker visibility into details.

Perform real time monitoring of agent-customer interactions for contact center management.

Empowering agents (e.g., alerting agent at the start of a call that a customer may be frustrated, protecting agents from abusive customers, and motivating agents to achieve higher sentiment scores).

3. Example Architecture for the Sentiment Classifier

In one embodiment, the speech sentiment classifier is a neural network that includes one or more bidirectional long short-term memory (LSTM) layers, an attention-based weighted pooling layer that takes the output sequence of the bidirectional LSTM layer(s) and summarizes a frame-level embedding into an utterance embedding, and an output layer that maps the utterance level embedding into a sentiment class.

4. General

The methods described herein are embodied in software and performed by a computer system (comprising one or more computing devices) executing the software. A person skilled in the art would understand that a computer system has one or more physical memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention.

The invention claimed is:

1. A method, performed by a computer system, for predicting sentiment labels for audio speech utterances using a speech sentiment classifier pretrained with pseudo sentiment labels, the method comprising:

performing unsupervised pretraining of a speech sentiment classifier by using (i) a first dataset with audio speech utterances that are not labeled with a sentiment and (ii) a text-trained pseudo labeler to autogenerate sentiment labels for the first dataset, wherein pretraining the sentiment classifier comprises the following:

obtaining text transcriptions of the audio speech utterances in the first dataset;

for each audio speech utterance in the first dataset, applying the pseudo-labeler to the text transcription of the audio speech utterance to obtain a pseudo sentiment label for the audio speech utterance;

applying an audio encoder to the audio speech utterances in the first dataset to obtain a vector representation of each of the audio speech utterances;

training the speech sentiment classifier to predict the pseudo sentiment labels for the audio speech utterances in the first dataset given the vector representations of said audio speech utterances;

fine tuning the speech sentiment classifier using a second dataset with audio speech utterances that are each labeled with a sentiment, wherein fine tuning the sentiment classifier comprises:

applying the audio encoder to audio speech utterances from the second dataset to obtain vector representations of each the audio speech utterances in the second dataset; and training the speech sentiment classifier to predict the sentiment labels for the audio speech utterances in the second dataset given the corresponding the vector representations of said audio speech utterances; and using the trained sentiment classifier to predict sentiments for unlabeled audio speech utterances.

2. The method of claim 1, wherein the pseudo-labeler is a text sentiment classifier previously trained on text data.

3. The method of claim 1, wherein obtaining the text transcripts comprises converting the audio speech utterances in the first dataset to text using an automatic speech recognition (ASR) system.

4. The method of claim 1, wherein the audio encoder is the encoder part of an ASR system having an encoder and a decoder.

5. The method of claim 1, wherein the audio encoder is the encoder part of a Wav2Vec model.

6. The method of claim 1, wherein the sentiment classifier includes:
one or more bidirectional long short-term memory layers;
an attention-based weighted pooling layer that takes the output sequence of the bidirectional long short term memory layer(s) and summarizes a frame-level embedding into an utterance level embedding; and
an output layer that maps the utterance level embedding into a sentiment class.

7. The method of claim 1, wherein the sentiment labels in the pretraining step and the fine tuning step are different.

8. The method of claim 1, wherein the first dataset is larger than the second dataset.

9. The method of claim 1, wherein in the pseudo-labeler is a pre-trained language model with a sentiment classification layer fine tuned with sentiment data.

10. The method of claim 9, wherein the pre-trained language model is a bidirectional encoder representation from transformers (BERT) model.

11. The method of claim 1, wherein pretraining the sentiment classifier comprises iteratively adjusting the parameters of the sentiment classifier to optimize prediction accuracy of the pseudo labels, and training the sentiment classifier comprises iteratively adjusting the parameters of the sentiment classifier to optimize prediction accuracy of the sentiment labels in the second dataset.

12. The method of claim 11, wherein, in the pretraining and training steps, the parameters of the audio encoder also are iteratively adjusted to optimize predictions of the pseudo labels and the labels from the second dataset.

13. A non-transitory computer-readable medium comprising a computer program, that, when executed by a computer system, enables the computer system to perform the following method for predicting audio speech utterances using a speech sentiment classifier pretrained with pseudo labels, the method comprising:

performing unsupervised pretraining of a speech sentiment classifier by using (i) a first dataset with audio speech utterances that are not labeled with a sentiment and (ii) a text-trained pseudo labeler to autogenerate sentiment labels for the first dataset, wherein pretraining the sentiment classifier comprises the following:

obtaining text transcriptions of the audio speech utterances in the first dataset;

for each audio speech utterance in the first dataset, applying the pseudo-labeler to the text transcription of the audio speech utterance to obtain a pseudo sentiment label for the audio speech utterance;

applying an audio encoder to the audio speech utterances in the first dataset to obtain a vector representation of each of the audio speech utterances;

training the speech sentiment classifier to predict the pseudo sentiment labels for the audio speech utterances in the first dataset given the vector representations of said audio speech utterances;

fine tuning the speech sentiment classifier using a second dataset with audio speech utterances that are each labeled with a sentiment, wherein fine tuning the sentiment classifier comprises:

applying the audio encoder to audio speech utterances from the second dataset to obtain vector representations of each the audio speech utterances in the second dataset; and training the speech sentiment classifier to predict the sentiment labels for the audio speech utterances in the second dataset given the corresponding the vector representations of said audio speech utterances; and using the trained sentiment classifier to predict sentiments for unlabeled audio speech utterances.

14. The non-transitory computer-readable medium of claim 13, wherein the pseudo-labeler is a text sentiment classifier previously trained on text data.

15. The non-transitory computer-readable medium of claim 13, wherein in the pseudo-labeler is a pre-trained language model with a sentiment classification layer fine tuned with sentiment data.

16. The non-transitory computer-readable medium of claim 15, wherein the pre-trained language model is a bidirectional encoder representation from transformers (BERT) model.

17. A computer system for predicting audio speech utterances using a speech sentiment classifier pretrained with pseudo labels, the system comprising:

one or more processors;

one or more memory units coupled to the one or more processors, wherein the one or more memory units store instructions that, when executed by the one or more processors, cause the system to perform the operations of:

performing unsupervised pretraining of a speech sentiment classifier by using (i) a first dataset with audio speech utterances that are not labeled with a sentiment and (ii) a text-trained pseudo labeler to autogenerate sentiment labels for the first dataset, wherein pretraining the sentiment classifier comprises the following:

obtaining text transcriptions of the audio speech utterances in the first dataset;

for each audio speech utterance in the first dataset, applying the pseudo-labeler to the text transcription of the audio speech utterance to obtain a pseudo sentiment label for the audio speech utterance;

applying an audio encoder to the audio speech utterances in the first dataset to obtain a vector representation of each of the audio speech utterances;

training the speech sentiment classifier to predict the pseudo sentiment labels for the audio speech utterances in the first dataset given the vector representations of said audio speech utterances;

fine tuning the speech sentiment classifier using a second dataset with audio speech utterances that are each labeled with a sentiment, wherein fine tuning the sentiment classifier comprises:

applying the audio encoder to audio speech utterances from the second dataset to obtain vector representations of each the audio speech utterances in the second dataset; and training the speech sentiment classifier to predict the sentiment labels for the audio speech utterances in the second dataset given the corresponding the vector representations of said audio speech utterances; and using the trained sentiment classifier to predict sentiments for unlabeled audio speech utterances.

18. The system of claim 17, wherein the pseudo-labeler is a text sentiment classifier previously trained on text data.

19. The system of claim 17, wherein in the pseudo-labeler is a pre-trained language model with a sentiment classification layer fine tuned with sentiment data.

20. The system of claim 19, wherein the pre-trained language model is a bidirectional encoder representation from transformers (BERT) model.

\* \* \* \* \*